Figure 1:
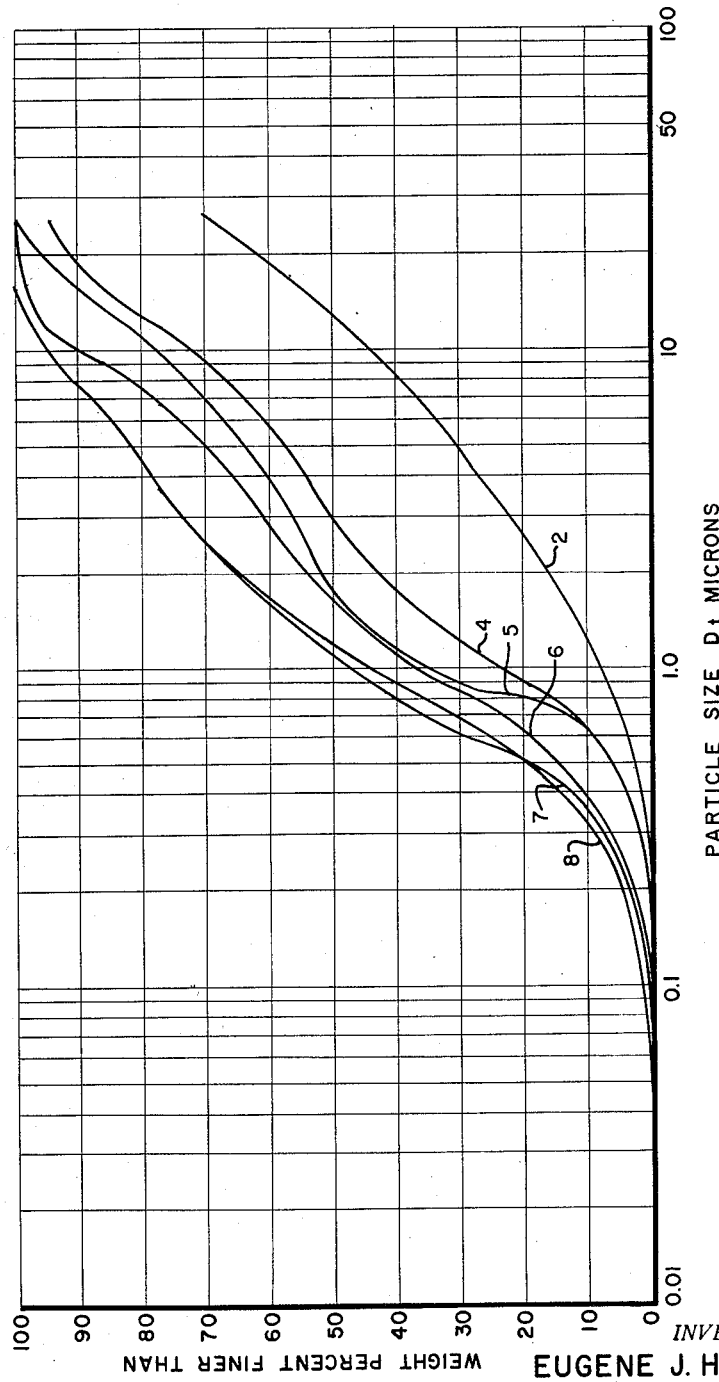

Jan. 12, 1960            E. J. HOUDRY            2,921,033

METHOD FOR THE MANUFACTURE OF CATALYSTS

Filed Aug. 5, 1954            3 Sheets-Sheet 2

INVENTOR.
EUGENE J. HOUDRY
BY
ATTORNEY

Jan. 12, 1960      E. J. HOUDRY      2,921,033
METHOD FOR THE MANUFACTURE OF CATALYSTS
Filed Aug. 5, 1954      3 Sheets-Sheet 3

*INVENTOR.*
EUGENE J. HOUDRY
BY
*William M. Gee*
ATTORNEY

United States Patent Office 2,921,033
Patented Jan. 12, 1960

2,921,033

METHOD FOR THE MANUFACTURE OF CATALYSTS

Eugene J. Houdry, Ardmore, Pa., assignor to Oxy-Catalyst, Inc., a corporation of Pennsylvania Application August 5, 1954, Serial No. 448,079

9 Claims. (Cl. 252—449)

This invention is concerned with the manufacture of molded catalyst pellets of catalytically active alumina and of similar inorganic oxides.

The use of molded pellets of certain inorganic oxides in their so-called catalytically active or adsorptive form, such as pellets of catalytically active forms of alumina, beryllia, or of composites such as silica-alumina, is well known in the art of catalysis. These pellets may be used as catalysts in themselves, such as pelleted silica-alumina hydrocarbon cracking catalysts, or they may be used as carriers or supports for other catalytic materials. Thus, for example, pellets of catalytically active beryllia or alumina impregnated with various metals such as platinum, ruthenium, palladium, nickel, copper, cobalt, chromium or mixtures of these metals are useful for carrying out many types of reactions such as oxidation, hydrogenation, desulfurization, hydrocarbon reforming reactions, as well as many others.

In the preparation of these pellet type catalysts, one of the main problems in the art has been to produce a pellet which is sufficiently hard and resistant to attrition to withstand severe conditions of operation. In some applications, for example, a bed of catalytic pellets may be subjected to constant movement and vibration, causing constant sharp impacts and rubbing of the pellets against one another and against the walls of the container. This is true, for example, in the so-called moving bed operations, common to the petroleum refining industry where catalytic pellets are constantly moved through various catalytic zones for reaction and regeneration. In this type of application the pellets must also be able to withstand rather large compression loads which result from the use of catalytic beds of substantial depth. Another example of an application where the resistance of the pellet to mechanical attrition is of great importance is in the use of pellet type of oxidation catalysts for the elimination of obnoxious fumes given off by internal combustion engines during operation. Where a catalytic exhaust purifier is installed on a vehicle the catalytic pellets, which for example may be pellets of catalytic alumina impregnated with a metal such as platinum, silver or the like, are subjected to constant vibration and mechanical shock due to engine vibration and vibration and shocks resulting from the movement of the vehicle over the road.

At the present time, molded catalyst pellets of this type are prepared in several ways. According to one method of preparation, the oxide is prepared by precipitating a gelatinous gel from an aqueous solution, removing a portion of the free water without destroying the gelatinous character thereof and then extruding or otherwise molding the gelatinous mass into pellets which are cut to desired dimensions and then dried and activated. Thus for example, gelatinous aluminum hydroxide may be precipitated from a solution of aluminum nitrate by the addition of alkali, followed by so-called syneresis of the gel, to remove a portion of the water of gelation, and the gelatinous mass then extruded into pellets of alumina which are dried to the alumina hydrate which is then calcined to produce the active form by removal under controlled conditions of a portion or substantially all of the hydrated water to produce a porous structure of high internal surface area and pore volume.

Another method for producing catalytic pellets of active alumina and of similar active oxides is to prepare a catalytic form of the oxide as a fine powder, mix the powder with a suitable lubricant and binder, usually a waxy organic material, and then form pellets from this mixture by a pelletizing operation on any of the well known pelletizing machines such as a Stokes pelletizer. Because of the poor cohesive properties of such a catalytic powder it has generally not been found feasible to extrude the oxide in the powder form, thus forcing the art to resort to the more expensive pelletizing operations in which the powder, mixed with a binder or lubricant, is pressed into pellets in small individual molds.

While the physical characteristics of the pellets produced according to the above described methods, and by other methods previously employed, may vary considerably depending upon the particular method used, there has been as previously stated, general difficulty in producing pellets of good hardness and resistance to mechanical attrition. It is the object of the present invention to provide a solution for this long standing problem by providing an economical and reliable method for producing such catalytic pellets of the desired physical characteristics.

In accordance with the invention, it has been found that molded pellets of catalytically active alumina and of catalytically active forms of similar inorganic oxides having superior physical characteristics may be produced by molding the pellets from a mass containing the oxide in an at least potentially active but non-gelatinous form and in a critically fine degree of subdivision. As will appear from the description and illustrative examples which follow, the degree of subdivision of the oxide in the mass from which the pellets are molded is of critical importance in determining the physical character of the pellets, particularly their hardness and resistance to attrition, and likewise is critical in determining the moldability of the mass, particularly its ability to be successfully extruded. Little or only relative minor improvement in these characteristics is obtained by particle size reduction until the required degree of subdivision as specified hereinafter has been achieved, whereas when this degree of subdivision has been reached, an unexpectedly sudden improvement in both the physical characteristics of the pellets and in the molding characteristics of the oxide is obtained.

The oxide in its required degree of subdivision is generally characterized by a relatively high specific surface contributed largely by sub-micron particles, and by the absence of more than negligible weight percentages of particles of over 40 microns in size. More specifically, the subdivided material should have a specific surface of at least 60,000 cm.$^2$/cm.$^3$ (as determined in the manner hereinafter explained) and preferably of at least 65,000 cm.$^2$/cm.$^3$ and consist of substantially 100% by weight of particles of less than 40 microns, and preferably less than 25 microns, in size.

In general any device or technique for particle reduction may be employed which is capable of effecting the required degree of size reduction and which does not detrimentally affect the catalytic properties of the starting material. Preferably, at least the final portion of the particles reduction is conducted by wet grinding procedure, starting most desirably with the material in the form of a relatively fine powder, such as one passing 100 mesh or finer, suspended in a liquid vehicle and preferably in an aqueous vehicle. One method that has been found to be particularly effective involves a so-called colloid milling type operation in which a liquid slurry, and preferably an aqueous slurry, of the starting material is passed between closely-spaced surfaces at least one of which is rapidly rotating thereby subjecting the material to size reduction by an action which at least in part involves a high degree of hydraulic shear. Using such a reduction technique, and without substantially disturbing the normal particle size distribution usually obtained in this type of reduction, the degree of reduction required according to the invention is reached when substantially 100% by weight of the material has been reduced to particles of less than 40 microns and preferably less than 25 microns in size, with at least 50% by weight consisting of particles ranging from about .01 micron to about 2 microns in size. With a particle size distribution of this character obtained in such a reduction operation the specific surface of the material will generally range in the order of or above 60,000 or 65,000 cm.$^2$/cm.$^3$ due chiefly to the presence of a large weight percentage of sub-micron particles.

The colloid-milling technique mentioned above, and to be described in more detail hereinafter, has the advantages of offering a highly intense action without substantially contaminating the starting material with extraneous substances during the size reduction operation. Most desirably a milling operation is employed in which the intensity of the reduction forces can be progressively increased as the reduction proceeds. Less intense reduction techniques such for example as a conventional ball milling operation will generally not produce the desired degree of size reduction within a reasonable period of time although such less intensive techniques may be employed preliminary to a more drastic reduction.

In determining whether any given sample of the starting material has been reduced to the required degree of fineness, examination of the sample for particle size and specific surface may of course be made by any method which will give reproducible results, such, for example, as electron microscope examination, sedimentation analyses or a combination of these or other techniques. It should, however, be noted that the absolute values obtained as to particle size, particle size distribution and specific surface will vary somewhat depending upon the particular techniques used to determine these characteristics. Since such absolute values are relative to some extent to the method by which they are obtained, only those values which are obtained by the same or substantially equivalent methods can be strictly compared. The numerical values given herein for particle size and specific surface were determined by a combination of sedimentation analysis and electron microscope examination in a manner which will be outlined hereinafter in detail and it is to be understood that these values are strictly comparable only to values determined in the same or in a substantially equivalent manner.

In addition to particle size examination, it has been found that other methods may be used for determining when the required degree of subdivision has been obtained. When, for example, the particle size reduction is carried out by a wet grinding procedure using an aqueous suspending medium, it has been found that the required degree of subdivision can be determined readily and with a good degree of accuracy by observation of the physical appearance and characteristics of the aqueous slurry. If, for example, a starting slurry is formed consisting of the oxide in particulate form suspended in about an equal weight of water, and this suspension subjected to a colloid milling or to a similar suitable particle size reduction operation of sufficient intensity, it will be found that as the reduction proceeds, the slurry becomes gradually more smooth and creamy in character and gradually increases in viscosity until eventually a smooth paste is obtained having a consistency similar to that of a plaster mix suitable for troweling, which shows little or no tendency to separate into two phases even on prolonged standing. The ability of the subdivided material to thus form substantially non-separating slurries of viscous consistency with an approximately equal weight of water has been found to be a quick and convenient method for determining when the required degree of subdivision has been obtained although very considerable improvement in the quality of the pellets and in the molding characteristics of the material may result somewhat before this phenomenon is clearly observable.

Catalytic pellets that may be prepared in accordance with the invention generally include those comprised of difficultly reducible inorganic oxides (that is oxides of the type which are not reduced in a stream of hydrogen at temperatures of the order of 500° F.) which may be prepared in the form of gelatinous hydrated oxides; and which are produced in catalytically active form by dehydration of the hydrated oxide under controlled conditions to form structure of large internal pore volume and surface area. Materials of this class which have been found to be suitable include alumina, beryllia, zirconia, thoria, magnesia and silica, including of course combinations and composites of these such as alumina-beryllia, alumina-zirconia, alumina-silica composites. The invention is particularly advantageous in its application to the production of pellets composed of catalytically active alumina, or of composites of catalytically active alumina with catalytically active forms of other oxides in the group.

It is, of course, well known in the art that only certain forms of these inorganic oxides are catalytically active. The catalytically active or so-called adsorptive forms of these oxides is characterized by a porous structure which possesses a large internal pore volume and surface area, and as previously stated, are prepared in this form by controlled dehydration of a hydrated form of the oxide, control of temperature during such dehydration being essential to prevent destruction of the porous structure. In the case of alumina, for example, certain forms, such as the so-called alpha alumina, also frequently referred to as corundum or Alundum, possesses substantially no catalytic properties, being characterized by a relatively dense structure having little or no internal pore volume or surface area. Catalytically active alumina, on the other hand, may be prepared for example by precipitating a hydrous alumina gel from a solution of an aluminum salt, drying the gel, and thereafter heating carefully at a temperature no higher than about 2000° F. to expel the hydrated water and produce a partially anhydrous or substantially anhydrous oxide which is often referred to as gamma alumina. Catalytically active alumina may also be prepared from the naturally occurring bauxite, which contains hydrated alumina by removal of the impurities which it contains such as iron and silicates, followed by heating at a temperature below about 2000° F. to drive off the hydrated water. This heating procedure at controlled temperature to drive off hydrated water is commonly termed activation or calcination. The completely hydrated form of these oxides possesses substantially no catalytic activity although it is said to be potentially active since it may be rendered catalytically active by calcination to provide the anhydrous or partially anhydrous form.

The degree of purity required in these oxides for catalytic use depends somewhat upon the particular type of catalyst to be prepared and the conditions under which it is to be used. Generally speaking, however, in the production of good quality catalysts, the oxide should be of high purity preferably containing no more than fractional percentages of materials such as iron and sodium, which often tend to detrimentally affect the activity.

As stated previously, the mass from which the pellets are molded should contain the finely divided oxide in an at least potentially active but non-gelatinous form, which, in a mechanical reduction operation such as a wet grinding procedure, requires that the oxide be in this form when the particle size reduction is carried out. Thus, suitable starting materials for such a reduction operation include a fully hydrated form of the oxide, such as alumina trihydrate, which is potentially active, that is capable of being rendered catalytically active by calcination, and also include partially or completely activated forms of the oxide such as a partially or almost completely anhydrous alumina hydrate prepared by controlled calcination of the hydrated form. The starting oxide, however, should be non-gelatinous in character, that is the original gel, in cases where the oxide is prepared by precipitation, should be evaporated substantially to dryness, thus removing substantially all of the loosely bound water present in the original gel. For example, in the preparation of alumina from a solution of aluminum nitrate, a gelatinous hydrated oxide may be produced by precipitation by the addition of ammonium hydroxide to the aluminum nitrate solution. The gelatinous precipitate thus produced containing large amounts of loosely bound water of gelation, should be evaporated at least substantially to dryness thus producing a hydrated but non-gelatinous form such as alumina trihydrate.

In some cases, it has been found decidedly preferable that the mass from which the pellets are molded contain the finely divided oxide in an intermediate degree of calcination, that is, in a condition resulting from the removal of a portion but not all of the chemically combined water. This has been found to be particularly true when molding pellets consisting principally or substantially entirely of alumina. Thus, in the case of alumina the best results are obtained generally when the alumina particles in the molding dough are in a condition resulting from the removal of a major portion but not all of the chemically combined water present in the original trihydrate, the alumina particles most desirably containing from 5% to 20% by weight of chemically combined water. Fully hydrated alumina, i.e. alumina trihydrate contains about 35% by weight of chemically combined water. When the alumina particles are in such degree of hydration, both the molding characteristics of the molding mass and the quality of the finished pellets have been found to be generally at their optimum. With respect to particle size reduction operation itself, it has been found desirable in most cases, although not essential, to avoid the use of highly calcined, though catalytically active materials, such as oxides which have been calcined to remove all but a fractional percentage of the chemically combined water, since such forms tend to be rather hard and abrasive, particularly in the case of materials such as alumina or silica-alumina, which renders the reduction operation more difficult and costly.

When the oxide has been reduced to the required particle size, it may be molded into pellets of any desired shape and by any desired method. According to the most usual and preferred method, the pellets are molded from a moist mass of the finely divided oxide after adjusting the moisture content thereof to the desired moldable consistency. When the particle size reduction is carried out by wet grinding in an aqueous suspending medium, the desired moldable consistency may conveniently be obtained by evaporating the aqueous slurry resulting from the reduction operation, this evaporating operation being performed conveniently in some sort of a mulling machine preferably with provision to hasten evaporation by application of heat. It is important during evaporation that the material be kept in a homogeneous state in order to prevent local drying which would result in a final molding mass of non-homogeneous moisture content.

While any desired molding method may be used, preferably the pellets are molded by extrusion since this molding method generally gives pellets of excellent hardness and is usually considerably more economical than other methods. The possibility of successfully employing extrusion molding techniques for shaping the oxide into pellets is in fact, a salient feature of the invention, affording important economies over the more expensive pelletizing techniques commonly used to mold the oxide powder.

For extrusion purposes, it is preferable that the mass of finely divided oxide be brought to the consistency of a dry dough by adjustment of the moisture content of the mass. The optimum moisture content to produce a mass of optimum extrudability and for the production of a pellet of the best physical characteristics will vary somewhat depending upon the particular oxide. In general, however, it may be stated that the dough for extrusion will generally have a moisture content ranging from about 15% to 35% by weight (moisture determined by evaporation to constant weight at a temperature of the order of 250° F.). To obtain hard, dense pellets, the dough should extrude under a considerable pressure, pressures of at least about 150 pounds per square inch and preferably considerably higher, for example of the order of 500 to 3,000 pounds per square inch, being desirable. One of the most convenient methods for determining the proper moisture content of the dough in any particular case is to empirically adjust the moisture until the desired extrusion pressure is obtained. The lower the moisture content, in general, the higher is the required extrusion pressure.

According to a particularly preferred embodiment of the invention, a water soluble compound, such as aluminum nitrate, which may be decomposed into its corresponding oxide, such as alumina, is incorporated with the finely divided oxide prior to molding by forming a homogeneous mixture of the finely divided oxide with an aqueous solution of the compound, such compound being then decomposed, preferably by heat, after the pellets are molded. In the usual operation, where the oxide is reduced in particle size by wet grinding in an aqueous suspending medium, incorporation of the compound may be done conveniently by dissolving the decomposable compound in the aqueous slurry obtained at the end of the reduction operation and thereafter evaporating to produce the desired molding consistency. Thus, for example, to a water slurry of alumina particles reduced to the required degree of subdivision, aluminum nitrate crystals may be added, the mixture being stirred until the aluminum nitrate is dissolved and then with continuous stirring and agitation, the moisture content of the resultant mixture adjusted to produce the required molding consistency. The dough of alumina moist with the aqueous solution of aluminum nitrate may after drying be heat treated to a temperature of the order of 400–500° F. to cause decomposition of the aluminum nitrate into alumina. The dissolved compound, when decomposed, apparently has the effect of knitting the oxide particles together into a coherent structure, since the hardness and attrition resistance of the pellets produced according to this method have been found to be very favorably influenced by its presence.

The compound thus incorporated with the finely divided oxide generally speaking should be one which decomposes readily into a catalytically active oxide of the type with which the invention is concerned and which has relatively good water solubility. Water soluble salts of aluminum and strong acids, such as aluminum chloride, aluminum sulphate, and especially aluminum nitrate, are particularly desirable for this purpose. Water soluble salts, particularly those of strong acids, readily decomposable into beryllia, thoria or magnesia, though not as generally desirable as aluminum salts for this purpose, may also be used in some cases. The nitrates of the metals mentioned generally give the best results, having good water solubility and decomposing relatively easily by heat at relatively low temperatures.

The optimum amount of aluminum nitrate or other similar compound to be added for this purpose is best determined by experiment. Care should be taken not to dissolve more of such compound in the water slurry of the oxide than will remain in solution when the water is evaporated down for molding. Formation of crystals in the molding dough will interfere with the molding operation. By way of example it has been found that adding one part by weight of $Al(NO_3)_3 \cdot 9H_2O$ crystals to ten parts of a water slurry containing equal parts by weight of alumina and water gives excellent results, while the addition of as much as 1.8 parts by weight of $Al(NO_3)_3 \cdot 9H_2O$ to this same slurry resulted in crystallization of the aluminum nitrate during evaporation of the slurry to obtain an extrudable dough, giving unsatisfactory results.

After molding, the moist pellets may be dried by any suitable technique. Generally speaking, the best results are obtained by drying to remove free moisture relatively slowly and at a relatively low temperature. After drying the quality of the pellets will usually be improved by heat treating for several hours at a temperature of for example from about 500° F. to 1500° F.

When a heat-decomposable compound such as aluminum nitrate is incorporated with the oxide prior to molding a heat treatment is of course necessary to decompose the compound into its corresponding oxide. Heat treatment is, of course, also necessary when the oxide is molded in an unactivated or only partially activated form in order to produce the required degree of activation in the final pellets. Thus, in producing pellets from a coprecipitated silica-alumina gel which has been completely dried to remove the water of gelation but which has not been calcined to remove chemically combined water, it is necessary to heat-treat the molded pellets at a temperature of for example 1300° F. to produce the required degree of activation by removal of chemically combined water.

It may be desirable, though not necessary, in some cases to use a special drying method such as one described in detail in copending application Serial No. 346,484, filed April 2, 1953, by Eugene J. Houdry and James W. Harrison for Method for the Manufacture of Catalysts. Such a drying method, which has been found to give particularly good results when a decomposable compound such as aluminum nitrate is dissolved in the molding dough, requires that the pellets be slowly dried in an atmosphere which is very nearly saturated with water vapor, this being most conveniently accomplished by drying the pellets in an enclosed space which is provided with a small vent communicating with the atmosphere so that moisture evaporating accumulates and is permitted to escape to the atmosphere from the enclosure through this small vent by virtue of the slight positive pressure which builds up in the enclosure.

EXAMPLE I

A partially calcined alumina hydrate in powder form was mixed with water in the proportions of 5 kilograms of alumina powder in sufficient water to give 8 litres of slurry. The catalytic grade alumina powder employed was a free flowing powder having the following sieve analysis: 100% passing 150-mesh; 50% to 60% retained on 300-mesh; 40% to 50% passing 300-mesh; and had the following analysis:

| | |
|---|---|
| $Al_2O_3$ | 90.2%. |
| $Na_2O$ | 0.43%. |
| $Fe_2O_3$ | Less than 0.36%. |
| $SiO_2$ | Less than 0.18%. |
| Combined $H_2O$ | 9.1%. |

This mixture was passed repeatedly through a colloid mill, being careful to maintain uniformity of the slurry by agitation. The colloid mill employed is manufactured by the Troy Engine & Machine Company, of Troy, Pennsylvania, and consists of a rotating disc and a stationary disc which may be metal or ceramic faced, with means for adjusting the clearance between these discs, and thus adjusting the intensity of the reduction action. The rotating disc revolves at a speed of 20,000 r.p.m. while the slurry is pumped between it and the stator.

The original mixture was passed through this mill a total of eight times. During the first pass the clearance between the stator and rotor was adjusted to about .005". During the succeeding passes this clearance was reduced to zero clearance and below, that is the discs were biased toward one another with considerable force so that in the absence of the film of slurry pumped between them which acts as a lubricant, they would be directly in contact. The action produced by the mill operated in this manner is believed to be a combination of hydraulic shear and attrition caused by inter-particle attrition and direct attrition between the surfaces of the discs. This latter attrition action is evidenced by the fact that the surface of the discs tends to show progressive wear.

A sample of the slurry was withdrawn after each pass and set aside for testing and observation. These samples were numbered in order from 0 to 8, corresponding to the starting slurry, and the slurry after the first, second, third, etc., pass through the mill.

During the first five passes through the mill, the viscosity of the slurry did not change significantly; on the sixth pass a definite increase in viscosity was noted, the slurry having the pour characteristics of a thick syrup. On the seventh and eighth passes the viscosity increased still further and acquired a smooth, semi-self-sustaining consistency similar to the consistency of a plaster when mixed with the proper amount of water for troweling.

As the particle reduction proceeded, the tendency toward phase separation progressively decreased, until in the samples obtained from the last two or three passes through the mill, containing approximately 50% by weight of water (solids content determined by evaporating the water slurry at a temperature of the order of 200° F. to 250° F.) very little phase separation occurred even after prolonged periods of standing. Samples of the earlier passes when set aside settled rather rapidly into a supernatant water phase with a lower, solids-containing phase.

The particle size distribution in the samples from the third to the eighth pass through the mill (samples 3 to 8) was determined in the following manner. One set of particle size distribution analyses were made using the Bouyoucas hydrometer method which is based upon Stokes' law for the settling rate of particles suspended in a fluid. A typical procedure using this method is described in ASTM Standard (1952), Part 3, published by American Society for Testing Materials, pages 1420 to 1430 (ASTM designation: D422–51), and this method is also described in Kaolin Clays and Their Industrial Uses published by J. M. Huber Corporation, New York, N.Y., page 99.

Figure 2:
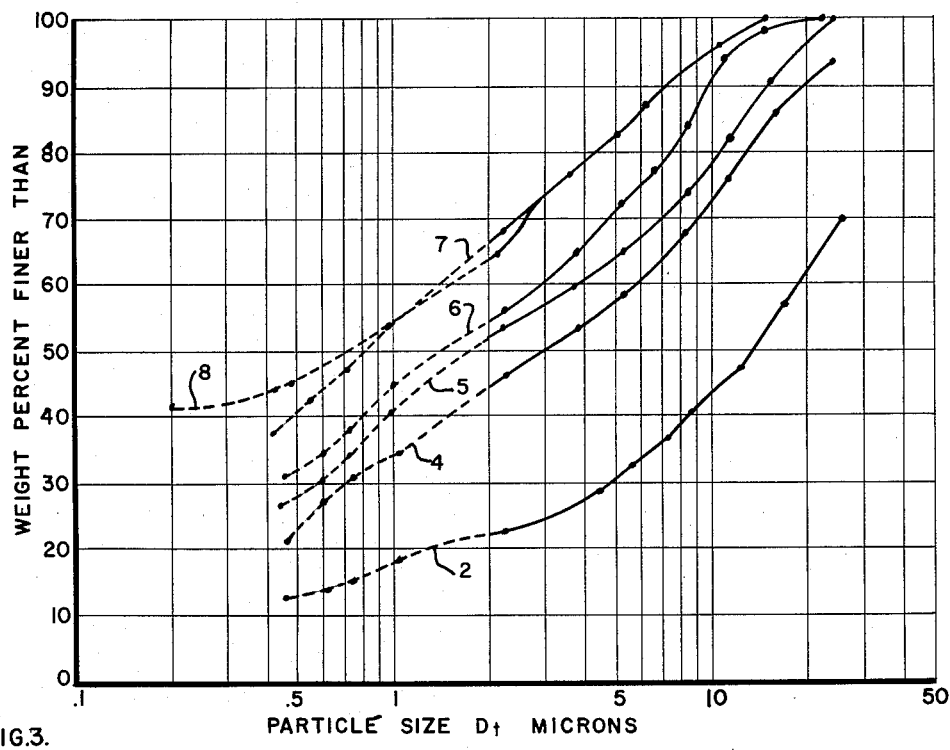

The results of sedimentation analyses by this method on samples 2, 4, 5, 6, 7 and 8 (corresponding respectively to the samples taken after the second, fourth, fifth, sixth, seventh and eighth passes through the colloid mill) are illustrated in Fig. 2 of the drawings, where each curve is labeled with the number corresponding to the sample number which it represents. As may be seen, these curves are plotted on a semi-logarithmic scale, the percent by weight being plotted against the log of the particle size ($D_t$) in microns. Experimental points are shown by dots.

Since Stokes' law measurements assume that the particles are in the form of spheres, departures from the spherical shape tend to produce relatively large errors in the determination when the particles being examined by the sedimentation method are less than about 2 microns in size. Since the particles reduced in size in the manner described deviate considerably from the spherical form, and seem in some cases to be in the form of rather thin plates, particle size of this material as determined by sedimentation method cannot be considered completely reliable and for this reason, the portion of each curve in Fig. 2 below 2 microns is shown as a broken line.

To accurately determine the particle size distribution in the range below about 2 microns, electron microscope examination of samples 3 to 8 inclusive was carried out at magnifications of 10,470× and 32,500×. Slides were prepared for the electron microscope by mixing one drop of 0.2% formvar in ethylene dichloride with 2 drops of a sample and mixing for about 15 seconds between a pair of glass slides by moving the slides against one another with a rotary motion using slight finger pressure. Electron micrographs were taken of the samples thus prepared and all particles in the field which were observed at the 10,470× magnification were counted, while particles of 0.037 micron in diameter or larger were measured and classified into "bins" for groups having diameters within a stated range. A sufficiently large field was examined to permit measuring of the order of 250 or more particles per sample. Measurement of the smaller particles was done at a magnification of 32,500×. Based on these observations, the percent of particles in each bin based on the total number of particles counted was determined. These percentages are tabulated in the table below:

*Table 1*

| Bin | Bin Size, Microns | Percent of Particles in Each Bin | | | | | |
|---|---|---|---|---|---|---|---|
| | | Sample 3 | Sample 4 | Sample 5 | Sample 6 | Sample 7 | Sample 8 |
| 2 | .037 | 83.31 | 35.98 | 42.75 | 31.53 | 49.15 | 11.24 |
| 3 | .053 | 3.95 | 14.30 | 4.25 | 24.00 | 2.90 | 15.20 |
| 4 | .073 | 2.35 | 16.10 | 8.00 | 18.00 | 6.60 | 19.00 |
| 5 | .107 | 3.30 | 10.70 | 8.50 | 10.00 | 10.00 | 19.40 |
| 6 | .150 | 2.25 | 10.50 | 7.50 | 6.10 | 9.20 | 18.00 |
| 7 | .215 | 1.78 | 4.30 | 8.50 | 3.50 | 8.90 | 6.20 |
| 8 | .300 | 1.26 | 3.00 | 6.60 | 2.90 | 4.70 | 6.30 |
| 9 | .430 | 0.70 | 2.07 | 4.80 | 2.30 | 3.90 | 2.40 |
| 10 | .600 | 0.48 | .98 | 2.70 | 0.76 | 2.70 | 1.20 |
| 11 | .850 | 0.48 | 1.13 | 4.30 | 0.46 | 0.90 | 0.53 |
| 12 | 1.2 | 0.19 | 0.66 | 1.40 | 0.30 | 0.30 | 0.34 |
| 13 | 1.7 | 0.27 | 0.12 | 0.70 | 0.15 | 0.45 | 0.19 |
| 14 | 2.4 | 0.09 | 0.12 | | | 0.15 | |
| 15 | 3.5 | | 0.04 | | | 0.15 | |
| 16 | 4.75 | 0.09 | | | | | |

From the data in Table I, the particle size distribution in samples 3 to 8 was determined for the range below 2 microns by calculating the weight ratios of particles in each bin below 2 microns in size and then relating these ratios to the total sample by taking the value for the total weight of particles below 2 microns from the sedimentation data. In sample 5, for example, the sedimentation data (see Fig. 2) shows that approximately 52% of the weight of the material is in particles of less than 2 microns in size. The distribution in this 52% can be determined knowing the weight ratios (as determined from Table I) of particles in each of the bins below 2 microns. The distribution curves thus determined for particles below 2 microns in size were combined with the particle size distribution curves for particles above 2 microns in size as determined by sedimentation analyses (solid portion of curves in Fig. 2), and these combined curves are shown in Fig. 1. From the above it is clear that in the curves shown in Fig. 1, the particle size distribution above 2 microns is as determined by sedimentation analyses, while that below 2 microns is as determined by electron microscope examination. A comparison of Fig. 1 with Fig. 2 shows that higher values for "percent finer than" are obtained by sedimentation techniques for particle sizes below 2 microns than are obtained by electron microscope analysis.

From the curves in Fig. 1, the specific surface of the material in each sample from 4 through 8, as expressed in square centimeters of particle surface per cubic centimeter of volume was determined by stepwise graphical integration of these curves using the relation:

$$\text{Specific surface in cm.}^2/\text{cm.}^3 = \frac{60,000}{D_t}$$

where $D_t$ is apparent particle size in microns as shown by the curves in Fig. 1, the total specific surface for each sample being, of course, the summation of the partial specific surfaces determined by using the above relation over small ranges of particle size along the length of the curve. This method of determining specific surface assumes that each particle is spherical or cubical in shape with a diameter or side equal to $D_t$ and of course represents only the external geometric surface of the particles and not the internal surface area resulting from pores and fissures. Specific surface determined by other methods, such as by light scattering techniques, may result in somewhat different numerical values.

Figure 8:
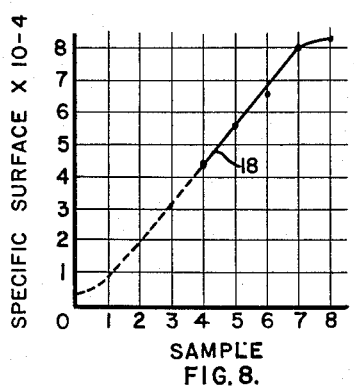

The values thus determined for specific surface for samples 4 to 8 are plotted in Fig. 8 of the drawings against sample number, curve 18 thus illustrating the rate at which specific surface varies with the successive passes through the colloid mill. The lower dotted portion of the curve is extra-polated. The curve indicates that the specific surface increases at a relatively constant rate with successive passes through the mill.

In order to demonstrate the improvement obtained by carrying out the particle size reduction to the required degree each of the nine samples (samples 0 through 8) were tested in the following manner: Two portions of each sample were first set aside, each portion containing about an equal weight of water and of alumina. To one portion of each sample there was added one part by weight of $Al(NO_3)_3 \cdot 9H_2O$ crystals to ten parts by weight of the water-alumina slurry. This portion was thoroughly stirred until the aluminum nitrate crystals were completely dissolved.

Both portions of each of the 9 samples, one portion containing the dissolved aluminum nitrate and the other portion containing only alumina and water, were then transferred to a mixing device where they were stirred constantly while a stream of hot air was blown over the surface causing evaporation of the water contained in the slurry until each of the two portions of each sample was reduced to the consistency of a dry dough, corresponding to a dry solids content of 75% to 80% by weight.

The dough thus obtained from each portion of each sample was then separately transferred to a hydraulic press in which an attempt was made to extrude the dough through an extrusion die having an orifice of 1/8" in diameter. Extrusion pressures varied from about 150 lbs. to 500 lbs. per square inch. The extrudate from the round hole die was cut into short lengths of about 1/8" to make cylindrical pellets. These pellets were thereafter dried, and those made from the portion of each sample containing dissolved aluminum nitrate were treated at a temperature of about 450° F. to decompose the aluminum nitrate into catalytic alumina.

In attempting to extrude the dough prepared from the earlier samples, only a portion of the material loaded into the cylinder ahead of the extrusion die could be forced through the die, the remainder of the material packing tightly in the cylinder in a hard, non-plastic mass that could not be extruded at any reasonable extrusion pressure. Most of the moisture present in the original dough loaded into the cylinder was expressed with the material which left the extrusion die, the hard mass remaining in the cylinder being almost dry.

Figure 4:
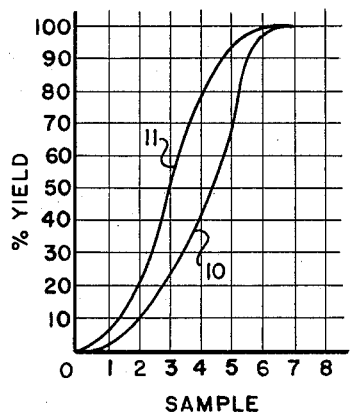

In the later samples, however, substantially all of the material which was loaded into the cylinder ahead of the extrusion die was successfully extruded and cut into pellets. Fig. 4 graphically illustrates the improvement in the extrudability obtained through the colloiding operation. An equal measured amount of each portion of each sample was loaded into the cylinder ahead of the extrusion die and an attempt was made in each case to extrude this measured amount into pellets of ⅛" diameter. In each case, the percentage yield of pellets from this measured amount of dough was determined by comparing the weight of the material which was successfully extruded into pellets to the weight of material which remained in the cylinder as a hard mass and which could not be extruded at pressures below about 1000 lbs., per square inch. Curve 10 is a plot of the results obtained using the dough obtained from the portion of each sample which contained only alumina and water, while curve 11 represents the results obtained from the portion of each sample to which aluminum nitrate had been added. As may be seen, a substantially 100% yield was obtained only from the dough prepared from the last three samples in which the particle size reduction had been carried sufficiently far.

Data obtained on the hardness of the pellets produced as described above shows even more strikingly the sharp change that appears when the particle size reduction has been carried to the required degree. The apparatus used to determine pellet hardness consisted of a knife blade hinged at one end with a spring tension force scale attached to the other end of the blade. The pellet is supported on a plate near the middle of the length of the blade and tested by measuring the force required to cut it diametrically, the cutting force being measured in pounds on the spring tension scale attached to the end of the blade. Five pellets of each portion of each sample were tested and the force readings averaged for each sample. The data obtained is graphically illustrated in Fig. 5. Curve 13 represents the force in pounds required to cut pellets from that portion of each sample containing only water and alumina, while curve 12 represents the force required to cut pellets from the portion of each sample which contained aluminum nitrate dissolved in the extrusion dough. It is clear from Fig. 5 that little improvement in the hardness of the pellets was obtained until the alumina had been reduced in particle size to the condition typified by sample 5, and that from this point on, the hardness increased rapidly, particularly in the last three samples.

Figure 5:
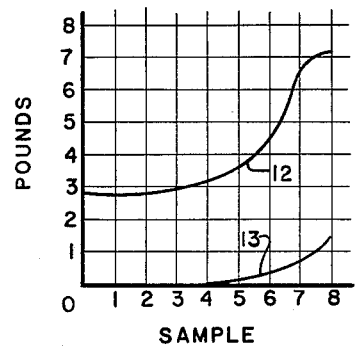
Figure 6:
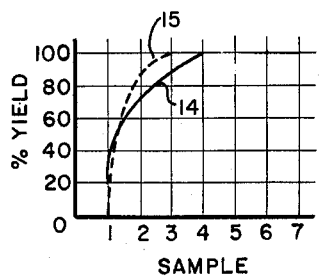

The data plotted in Fig. 5 also illustrates clearly the effect of the presence of the aluminum nitrate in the extrusion dough. The pellets prepared from the aluminum nitrate containing dough, and later heat treated to decompose the aluminum nitrate into alumina, are many times harder than the pellets prepared from the dough containing only water and alumina.

The alumina pellets prepared as described above are useful for a great many applications in the field of catalysis particularly where hardness and resistance to attrition are of importance. Excellent oxidation catalysts, for example, may be prepared by impregnating the alumina pellets with various metals such as platinum, palladium, silver, nickel, copper, etc. The impregnation is most conveniently accomplished by dipping the pellet into a solution of a salt of the metal and then decomposing the salt. Thus, for example, alumina pellets prepared according to the invention may be dipped into a 1% by weight aqueous solution of chloroplatinic acid, dried, and then the platinum salt decomposed into metallic platinum. The platinum-on-alumina pellet thus produced provides highly active and durable oxidation catalyst. Such pellets may, for example, be employed to catalytically oxidize the obnoxious oxidizable constituents of exhaust fumes from internal combustion engines which contain a variety of hydrocarbons, and oxygenated organics as well as carbon monoxide. In such an application, the catalytic pellets are submitted to severe and constant vibration and mechanical shock transmitted to the bed of catalyst by the engine and moving vehicle. Under these conditions, pellets prepared in accordance with the invention last many times longer than pellets prepared according to prior methods.

EXAMPLE II

A catalytic grade beryllia powder was mixed with an equal weight of water to form a slurry. The beryllia employed was a product of the Brush Beryllium Company, was calcined at a temperature of about 600° C. and had the following analysis:

| | Percent |
|---|---|
| BeO | 93.02 |
| Fe | .053 |
| Al | .343 |
| Si | .059 |
| Mn | .0764 |
| Ni | .0045 |
| Insolubles | .081 |
| Combined water (loss on ignition) | 5.21 |

This slurry was passed through a colloid mill of the same type and in the same manner as in Example I for a total of seven passes. Samples were collected and set aside at the end of each pass, as well as a sample of the starting slurry, these samples being labeled 0–A to 7–A respectively. As the particle size reduction proceeded, approximately the same behavior with respect to viscosity increase and progressive decrease in phase separation as in Example I. Samples 5–A, 6–A and 7–A were in the form of smooth paste, similar to samples 7 and 8 in Example I.

Figure 3:
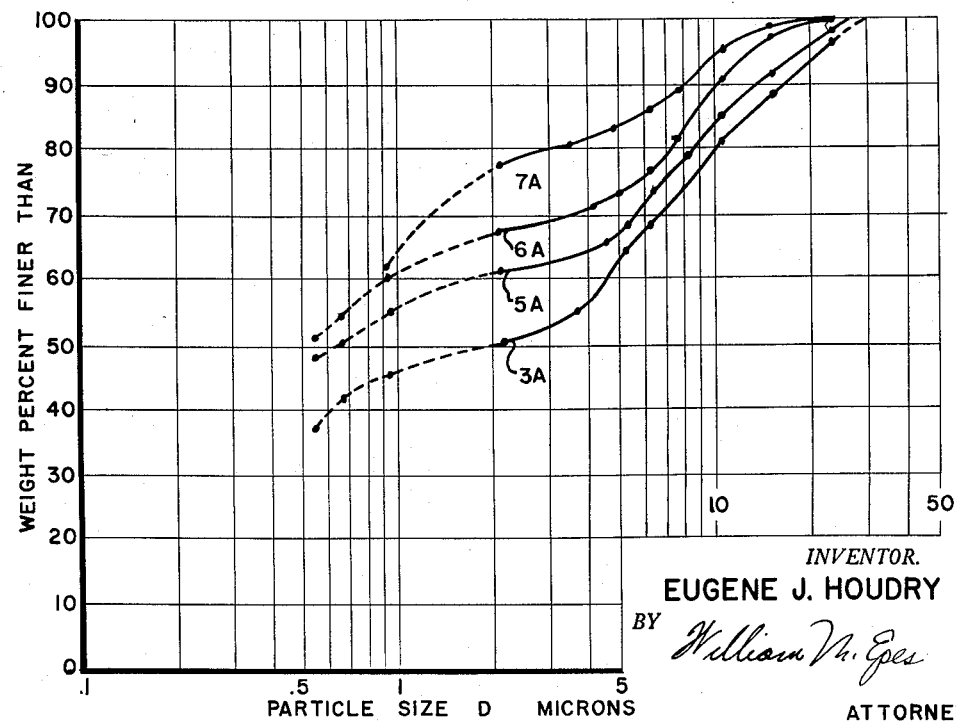

Samples 3–A, 5–A, 6–A and 7–A were analyzed for particle size distribution by sedimentation techniques as in Example I, and the results are illustrated in Fig. 3 of the drawings. As may be seen from these curves, the beryllia reduced somewhat more rapidly, sample 3–A showing substantially the same degree of fineness as sample 5 in Fig. 1.

To show the relative results obtained with respect to pellet quality and molding characteristics resulting from particle size reduction, beryllia pellets were prepared from each sample as follows: Two portions of each sample (0–A to 7–A) were first set aside, each portion containing about 42.8% solids and the remainder water. To one portion of each sample there was added aluminum nitrate crystals, Al(NO₃)₃·9H₂O, in the ratio of 10 grams of such crystals to 100 grams of the water-beryllia slurry. These portions were thoroughly stirred until the aluminum nitrate crystals were completely dissolved.

Both portions of each of the eight samples, one portion containing the dissolved aluminum nitrate and the other portion containing only beryllia and water, were then reduced in moisture content to produce a dry dough. The dough thus obtained from each portion of each sample was then separately transferred to a hydraulic press in which an attempt was made to extrude the dough through an extrusion die having an orifice of ⅛" in diameter. The extrudate from the round hole die was cut into short lengths of about ⅛" to make cylindrical pellets. These pellets were thereafter dried and those made from the portion of each sample containing dissolved aluminum nitrate were treated at a temperature of about 450° F. to decompose the aluminum nitrate into alumina. The percent yield of pellets from measured amounts of each sample was determined by comparing the weight of material which was successfully extruded into pellets to the weight of material which remained in the extrusion cylinder as a hard mass. Curve 14 is a plot of the results obtained from that portion of each sample which contained only beryllia and water, while curve 15 represents the results obtained from that portion of each sample to which aluminum nitrate had been added. As may be seen, a substantially 100% yield of pellets, indicating the achievement of an extrudable mass, was obtained only from the dough prepared from samples 3-A and above. As noted previously, sample 3-A shows substantially the same degree of fineness as sample 5 in Example I as may be seen from a comparison of the sedimentation data as illustrated in Figs. 2 and 3.

Figure 7:
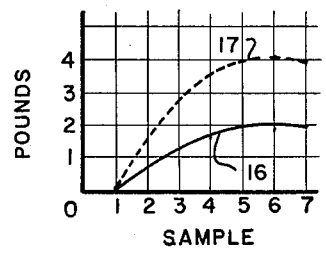

The hardness of the pellets produced from each sample is graphically illustrated in Fig. 7 of the drawings where curve 16 shows the hardness of the pellets produced from the molding dough containing only beryllia and water and curve 17 illustrates pellet hardness from those samples to which aluminum nitrate was added. The pellet hardness was determined in the same manner as in Example I. As may be seen from these curves, the particle size reduction caused the pellet hardness to increase from very small values in the first few passes to relatively high values in the later passes, the increase in hardness appearing to level off as the required degree of subdivision is reached between about samples 3-A and 5-A.

EXAMPLE III

A composite of silica and alumina, prepared by coprecipitation, and containing approximately 87.5% silica and 12.5% alumina and less than about .5% of impurities was the starting material in this example. The original gelatinous precipitate was dried to remove free water, but was not calcined. This material, in a relatively finely divided condition, was mixed with enough water to provide a water slurry containing about 30% by weight of dry solids (solids determined by evaporation of the slurry at a temperature of 250° F.). This mixture was repeatedly passed through a colloid mill of the type employed in Example I using the same techniques as in Example I.

The particle size reduction was carried to a point in which the fineness of the material approximated that of samples 7 and 8 in Example I. The water slurry after the last pass through the colloid mill contained about 34% by weight of dry solids and was of slightly syrupy consistency. When this material was subjected to evaporation to reduce its water content, it assumed a smooth, pasty consistency, with little or no tendency to separate into two phases on prolonged sanding at a dry solids content of about 45% by weight.

This material was then subjected to further evaporation with constant mixing until a dry dough was obtained. This dough was loaded into a cylinder provided with an extrusion die having a circular orifice with a diameter of about ⅛". Using a hydraulic press to operate the extrusion piston, the material was extruded at pressures varying between about 500 lbs. to 800 lbs. per square inch. The cylindrical extrudate was cut into pellets of about ⅛" to ¼", dried at room temperature in an open dish over night, and then dried for 2 hours in a conventional oven at 250° F. Following this, the pellets were heat-treated for 2 hours at a temperature of 1300° F. in a Lindberg type oven using bone dry air.

Knife tests similar to those described in Example I were conducted on the pellets prepared in this manner. These silica-alumina pellets showed an average knife test of 4.48 lbs.

Attempts to extrude the original material which had not been reduced to the required degree of subdivision were unsuccessful. Similar to the behavior of the alumina as described in Example I, material which had not been reduced to the required degree of fineness showed the same tendency to cake in the extrusion cylinder and to give only a partial yield of soft pellets.

Silica-alumina type pellets produced and described above provide excellent hydrocarbon cracking catalysts of high activity as well as enhanced resistance to attrition and increased compression strength.

While the invention has been described and illustrated by certain specific procedures and examples, it is understood of course that many variations thereof which will occur to those skilled in the art are possible within the spirit of the invention.

I claim:

1. In the manufacture of pellet type catalysts, a method for producing hard, attrition resistant molded pellets from a catalytically active form of an inorganic oxide selected from the group consisting of alumina, beryllia, and silica, said method comprising the step of extruding the pellets from a mass containing said oxide in an at least potentially active but non-gelatinous form and in such degree of subdivision that substantially 100% by weight thereof consists of particles of less than 40 microns in size, and the specific surface thereof is at least 60,000 cm.$^2$/cm.$^3$.

2. A method in accordance with claim 1 in which the oxide is in such degree of subdivision that substantially 100% by weight thereof consists of particles of less than 25 microns in size and the specific surface area thereof is at least 65,000 cm.$^2$/cm.$^3$.

3. In the manufacture of pellet type catalysts, a method of producing hard, attrition resistant molded pellets from a catalytically active form of an inorganic oxide selected from the group consisting of alumina, beryllia and silica, said method comprising the steps of extruding the pellets from a mass of said oxide moist with an aqueous solution of a compound decomposable into one of said oxides, said oxide being in an at least potentially active but non-gelatinous form and in such degree of subdivision that substantially 100% by weight thereof consists of particles of less than 40 microns in size and the specific surface thereof is at least 60,000 cm.$^2$/cm.$^3$, thereafter drying said pellets and decomposing said compound.

4. In the manufacture of pellet type catalysts, a method for producing hard, attrition resistant molded pellets from a catalytically active form of an inorganic oxide selected from the group consisting of alumina, beryllia, and silica, said method comprising the steps of extruding the pellets from a mass containing said oxide in the form of a partially calcined hydrate and in such degree of subdivision that substantially 100% by weight thereof consists of particles of less than 40 microns in size and the specific surface area thereof is at least 60,000 cm.$^2$/cm.$^3$.

5. In the manufacture of pellet type catalysts, a method for producing hard, attrition resistant molded pellets from a catalytically active form of an inorganic oxide selected from the group consisting of alumina, beryllia, and silica, said method comprising the steps of extruding the pellets from a mass of said oxide moist with an aqueous solution of a compound decomposable into one of said oxides, said oxide being in the form of a partially calcined hydrate and in such degree of subdivision that substantially 100% by weight thereof consists of particles of less than 40 microns in size and the specific surface thereof is at least 60,000 cm.$^2$/cm.$^3$, thereafter drying said pellets and decomposing said compound.

6. In the manufacture of pellet type catalysts, a method for producing hard, attrition resistant molded pellets of catalytically active alumina which comprises the step of extruding the pellets from a mass containing said alumina in an at least potentially active but non-gelatinous form and in such degree of subdivision that substantially 100% by weight thereof consists of particles of less than 40 microns in size and the specific surface thereof is at least 60,000 cm.$^2$/cm.$^3$.

7. In the manufacture of pellet type catalysts, a method for producing hard, attrition resistant molded pellets of catalytically active alumina which comprises the steps of extruding the pellets from a mass of alumina moist with an aqueous solution of a salt of aluminum and a strong acid decomposable by heat into alumina, said alumina being in the form of a partially calcined alumina hydrate and in such degree of subdivision that substantially 100% by weight thereof consists of particles of less than 40 microns in size, and the specific surface thereof is at least 60,000 cm.$^2$/cm.$^3$, drying said pellets and decomposing said aluminum salt into alumina.

8. In the manufacture of pellet type catalysts, a method for producing hard, attrition resistant molded pellets comprised of catalytically active alumina which comprises the steps of suspending a partially calcined alumina hydrate in particulate condition and containing from 5% to 20% by weight of chemically combined water in an aqueous suspending medium, passing said suspension between surfaces at least one of which is moving rapidly relative to the other to thereby effect particle size reduction of the starting particles, continuing said reduction until said alumina is of such particle size that substantially 100% by weight thereof is less than 40 microns in size; 50% by weight thereof ranges from .01 to 2 microns in size; and the specific surface thereof is at least 60,000 cm.$^2$/cm.$^3$, forming a homogeneous mixture of the finely divided alumina with an aqueous solution of aluminum nitrate, adjusting the moisture content of said mixture so as to form a doughy mass, extruding said mass under pressure into pellets, drying said pellets and decomposing said aluminum nitrate into alumina by heat.

9. In the manufacture of pellet type catalyst, a method for producing hard, attrition resistant molded pellets from a catalytically active form of an inorganic oxide selected from the group consisting of alumina, beryllia, and silica, said method comprising the steps of molding the pellets from a mass of said oxide moist with an aqueous solution of a compound decomposable into one of said oxides, said oxide being in at least potentially active but non-gelatinous form and in such degree of subdivision that substantially 100% by weight thereof consists of particles of less than 40 microns in size; 50% by weight thereof ranges from .01 to 2 microns in size; and the specific surface thereof is at least 60,000 cm.$^2$/cm.$^3$, adjusting the moisture content of said mixture so as to form a doughy mass, extruding said mass under pressure into pellets, drying said pellets and decomposing said decomposable compound by heat.

References Cited in the file of this patent
UNITED STATES PATENTS

| | | |
|---|---|---|
| 2,247,624 | Wall | July 1, 1941 |
| 2,423,686 | Cummins | July 8, 1947 |
| 2,580,806 | Malina | Jan. 1, 1952 |
| 2,650,202 | Hawes | Aug. 25, 1953 |
| 2,669,547 | Shabaker | Feb. 16, 1954 |
| 2,686,161 | Stewart | Aug. 10, 1954 |
| 2,695,893 | Houdry | Nov. 30, 1954 |